US006220680B1

United States Patent
Chen

(10) Patent No.: US 6,220,680 B1
(45) Date of Patent: Apr. 24, 2001

(54) COMPUTER HOUSING

(75) Inventor: Chih-Yoe Chen, Taoyuan Hsien (TW)

(73) Assignee: Enlight Corporation, Taoyuan Hsien (TW)

(*) Notice: Subject to any disclaimer, the term of this patent is extended or adjusted under 35 U.S.C. 154(b) by 0 days.

(21) Appl. No.: 09/572,067

(22) Filed: May 17, 2000

(51) Int. Cl.[7] .................................................. A47B 97/00
(52) U.S. Cl. .......................... 312/223.2; 312/244; 361/724
(58) Field of Search .............................. 312/223.1, 223.2, 312/265.6, 244, 257.1, 293.1, 293.3; 361/683, 724, 725, 727; D14/100, 102

(56) References Cited

U.S. PATENT DOCUMENTS 5,845,978 * 12/1998 Jung ............................... 312/223.2 X
5,931,550 * 8/1999 Chen ..................................... 312/244

* cited by examiner

Primary Examiner—James O. Hansen
(74) Attorney, Agent, or Firm—Dougherty & Troxell

(57) ABSTRACT

A computer housing is constructed to include an outer shell holding a mainframe, a face panel fastened to the outer shell and covered on a front side of the mainframe installed in the outer shell, and a handle fastened to the outer shell and a bracket at a back side of the mainframe installed in the outer shell, wherein the outer shell is injection-molded from plastic having four integrated side walls respectively disposed at the top side, the bottom side, and two opposite lateral sides.

1 Claim, 3 Drawing Sheets

COMPUTER HOUSING

BACKGROUND OF THE INVENTION

The present invention relates a computer housing, and more particularly to such a computer housing, which comprises an integrated outer shell injection-molded from plastics.

The computer housing of a computer, either horizontal or vertical type, comprises an outer shell. The outer shell is comprised of a plurality of metal panels fastened together by hook joints or screw elements. This structure of outer shell is complicated, and its manufacturing cost is high.

SUMMARY OF THE INVENTION

The present invention provides an outer shell for computer housing, which is injection-molded from plastics, having four side walls defining an open space through the front and rear sides. The integrated structure of the outer shell is seamless, and can easily be assembled with the other parts of the computer housing.

DETAILED DESCRIPTION OF THE PREFERRED EMBODIMENT

Figure 1:
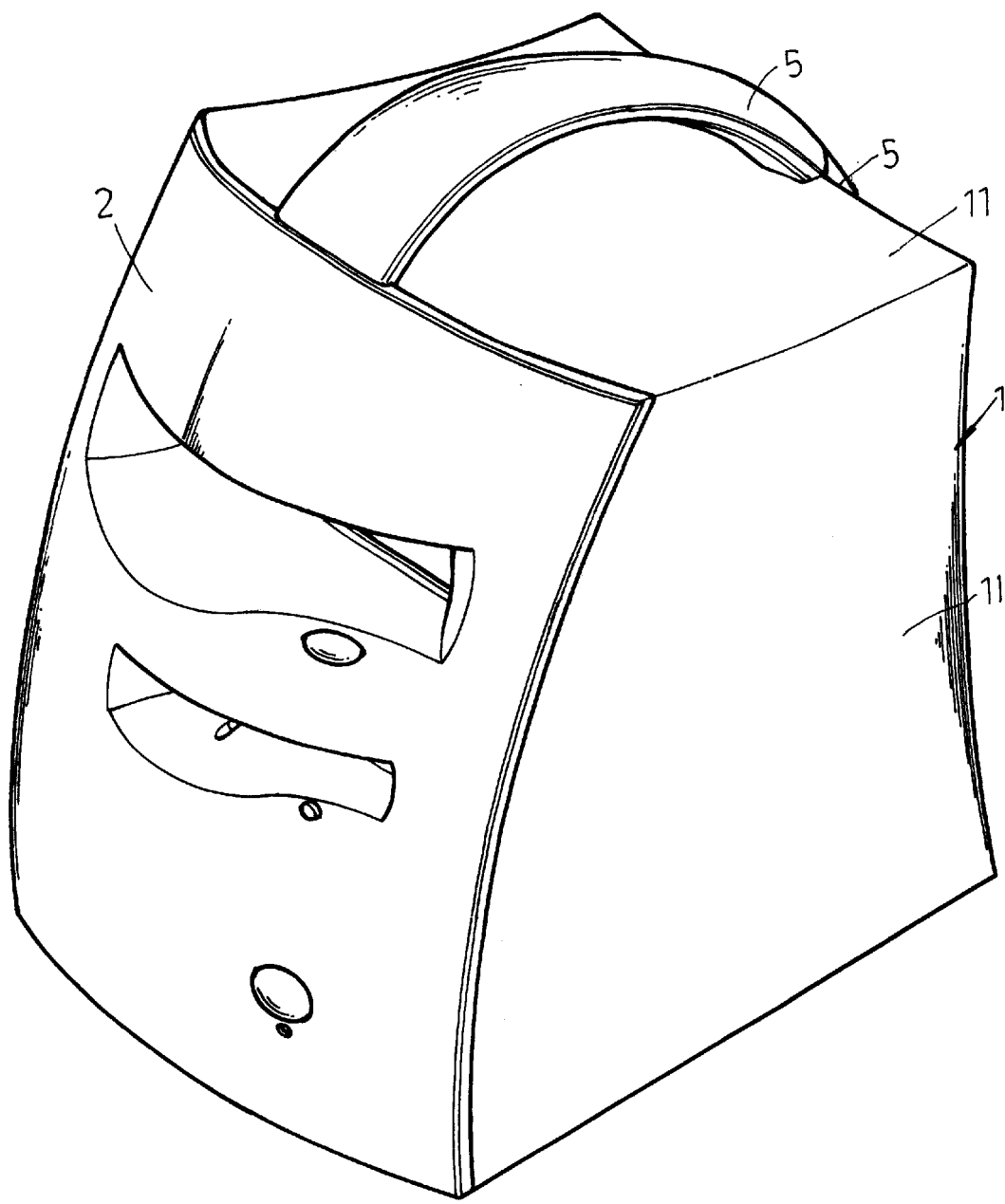
FIG. 1 is an elevational view of a computer housing constructed according to the present invention.
Figure 2:
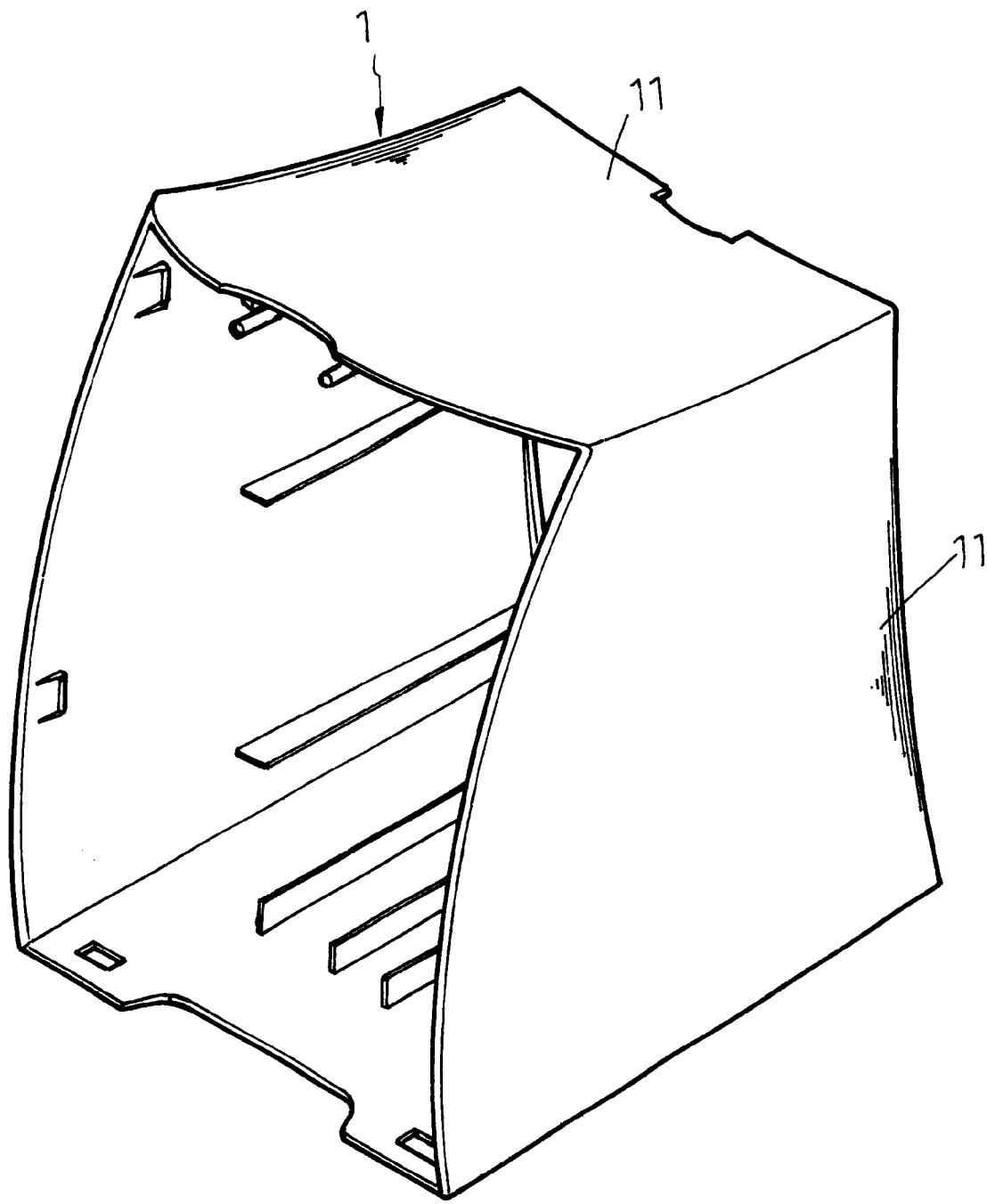
FIG. 2 is an elevational view of the outer shell for the computer housing according to the present invention.

Referring to FIGS. 1 and 2, a computer housing is shown comprised of an outer shell 1. The outer shell 1 is injection-molded from plastics, having four side walls 11 formed integral with one another and respectively disposed at the top side, the bottom side, and two opposite lateral sides.

Figure 3:
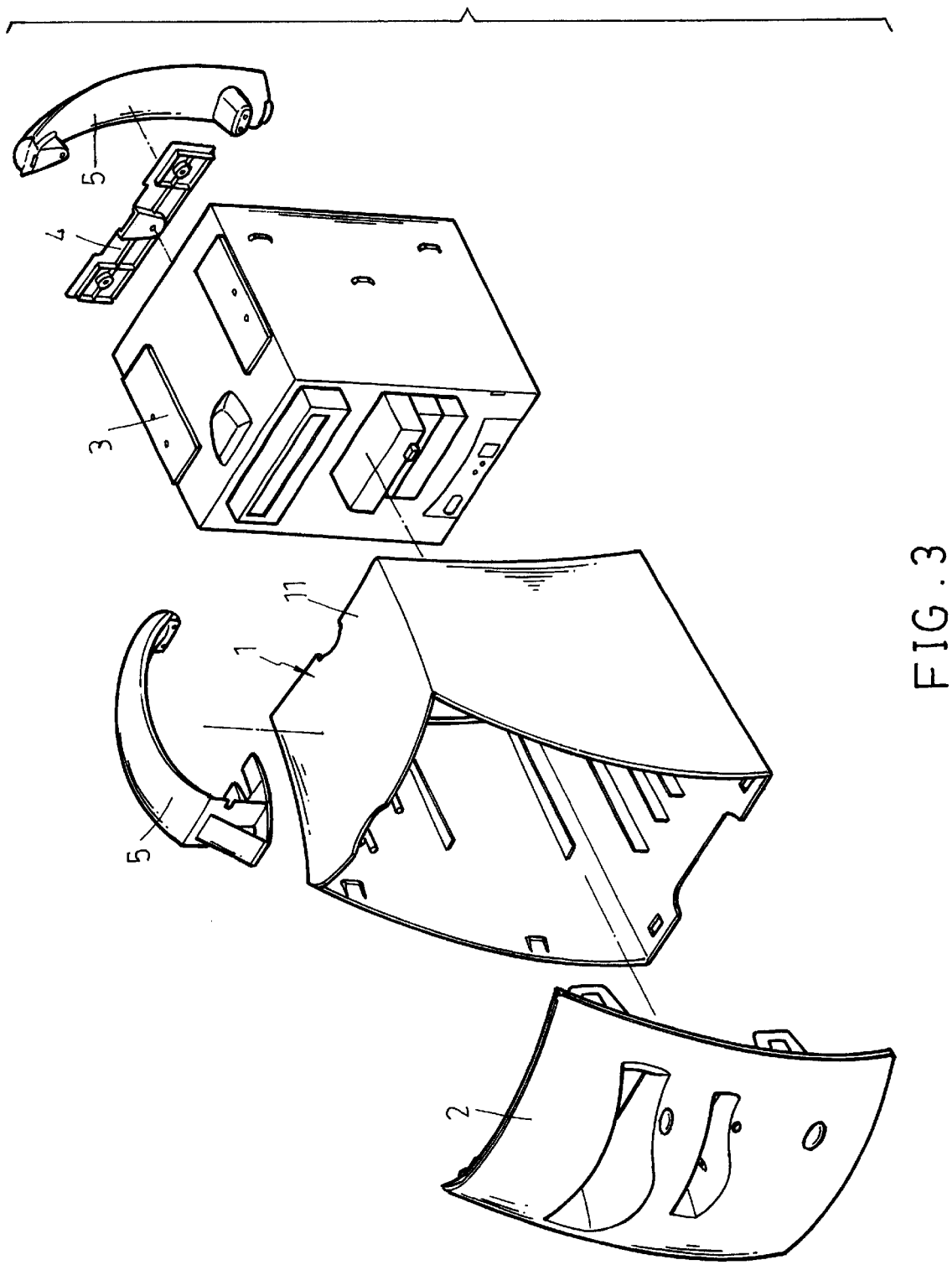
FIG. 3 is an exploded view of FIG. 2.

Referring to FIG. 3 and FIGS. 1 and 2 again, the outer shell 1 defines an axially extended open space, which receives a computer mainframe 3. After installation of the computer mainframe 3 in the outer shell 1, a front panel 2 is fastened to the front open side of the outer shell 1 and covered on the front side of the computer mainframe 3, a bracket 4 is fixedly fastened to the back side of the computer mainframe 3, and a handle 5 is connected between the front side of the top side wall 11 of the outer shell 1 and the bracket 4 for carrying by hand. The handle 5 is comprised of two parts coupled together.

Because the outer shell 1 is injection-molded from plastics, its manufacturing cost is low, and the assembly process of the computer housing is simple. Further, the seamless outer appearance of the outer shell 1 causes a sense of beauty.

What the invention claimed is:

1. A computer housing comprising an outer shell holding a computer mainframe;

said outer shell comprising a top side wall, a bottom side wall, two opposite lateral side walls formed integral with and connected in parallel between said top and bottom side walls and defining with the top and bottom side walls a front open side and a rear open side;

a face panel fastened to said outer shell and covering said front open side of the computer mainframe installed within said outer shell; and a handle comprising two parts coupled together, one of the parts being fastened to the top side wall of said outer shell, while the other part is fastened to a bracket attached to a back side of the computer mainframe.

* * * * *